United States Patent [19]

Fujimori

[11] Patent Number: 5,168,771
[45] Date of Patent: Dec. 8, 1992

[54] LEFT SIDE ACCELERATOR APPARATUS FOR PHYSICALLY HANDICAPPED PERSONS

[76] Inventor: Yoshio Fujimori, 6-31, Kajino-cho 2 chome, Koganei, Japan

[21] Appl. No.: 817,488

[22] Filed: Jan. 7, 1992

[30] Foreign Application Priority Data

Jan. 8, 1991 [JP] Japan .................................. 3038

[51] Int. Cl.[5] .............................................. G05G 1/16
[52] U.S. Cl. ....................... 74/562.5; 74/562; 74/512; 74/513; 180/320; 180/90.6
[58] Field of Search ............. 74/560, 562, 562.5, 74/512, 513, 515 R, 515 E; 180/320, 90.6

[56] References Cited

U.S. PATENT DOCUMENTS

| | | | |
|---|---|---|---|
| 2,253,850 | 8/1941 | Fisher | 74/562.5 |
| 2,521,606 | 9/1950 | Rodd | 74/562 |
| 2,799,181 | 7/1957 | Speckman | 74/562.5 |
| 2,819,629 | 1/1958 | Larson | 74/562.5 |
| 2,829,539 | 4/1958 | Wilcox | 74/562.5 |
| 2,914,961 | 12/1959 | Ewer | 74/562.5 |
| 2,944,439 | 7/1960 | Dalton | 74/562 |
| 3,075,602 | 1/1963 | Lanzone | 74/562 |
| 3,199,369 | 8/1965 | Kaul | 74/562.5 |
| 3,224,293 | 12/1965 | Rose | 74/562 |
| 3,224,294 | 12/1965 | Gresham | 74/562.5 |
| 3,477,310 | 11/1969 | Garcia | 74/562.5 |
| 3,543,606 | 12/1970 | Kaul | 74/562.5 |
| 3,626,785 | 12/1971 | Ross | 74/562 |
| 4,312,246 | 1/1982 | Barresi | 74/512 X |
| 4,324,309 | 4/1982 | Ginley | 74/515 R X |
| 4,587,865 | 5/1986 | Winner | 74/562.5 |

FOREIGN PATENT DOCUMENTS 1170255 5/1964 Fed. Rep. of Germany ..... 74/562.5

OTHER PUBLICATIONS

AAA—Simplified Basic Dual Control (American Automobile Association) Traffic Engineering & Safety Dept. 1938.
AAA—New 1953 Dual Controls (American Automobile Association), Washington, D.C.
Lazy—Leg, Evers–Manufacturing Co., Box 186, Lorain, Ohio (Sep. 1952).

Primary Examiner—Vinh T. Luong
Attorney, Agent, or Firm—Leydig, Voit & Mayer

[57] ABSTRACT

A left side accelerator apparatus for physically handicapped persons provided with a formation wherein a cover member is removably provided on a base fixed on an automobile floor side, a main shaft is rotatably supported by the cover member, a left side pedal arm fitted with a left side accelerator pedal is fitted to the main shaft at the left end and a right side arm having a roller in contact with an automobile side accelerator pedal is fitted to the main shaft at the right end so that the automobile side accelerator pedal may be operated by treading in the left side accelerator pedal. Thus, a person physically handicapped in the right foot can operate the accelerator of an automobile with the left foot and, when the apparatus is not used, it will be able to be removed by one touch so as not to be in the way of the driving operation by a non-handicapped person.

4 Claims, 6 Drawing Sheets

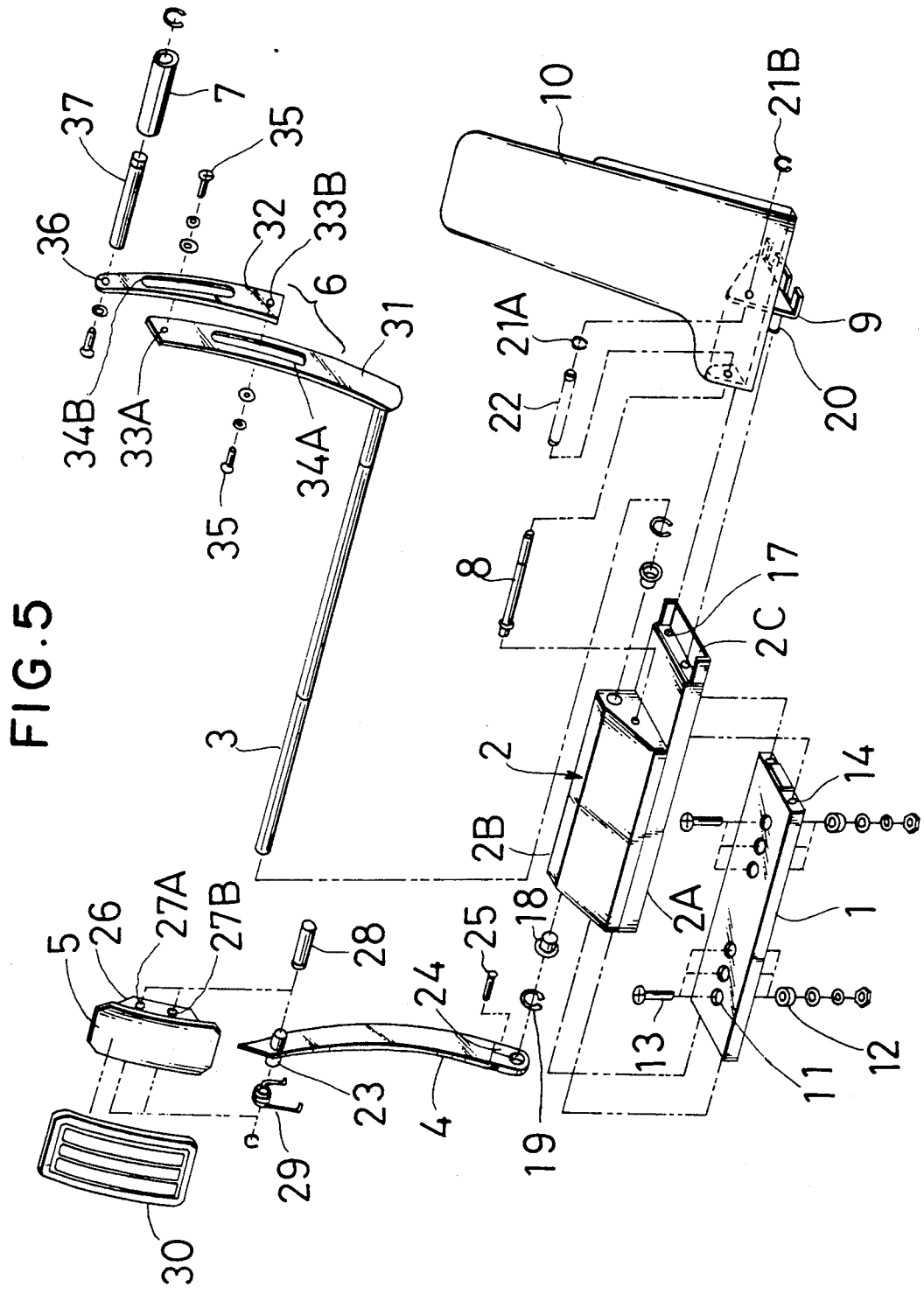

LEFT SIDE ACCELERATOR APPARATUS FOR PHYSICALLY HANDICAPPED PERSONS

BACKGROUND OF THE INVENTION

1. Field of the Invention

This invention relates to a left side accelerator apparatus for physically handicapped persons and more particularly to a left side accelerator apparatus for physically handicapped persons so that a person physically handicapped in the right lower limb may operate the accelerator of an automatic clutch type automobile with the left foot.

2. Description of the Prior Art

Generally, an accelerator pedal and brake pedal of an automobile are trodden with the right foot to be operated, Therefore, in case a person physically handicapped in the right lower limb is to drive an automatic clutch type automobile, the accelerator pedal positioned on the right side of the brake pedal will not be able to be operated and the automobile will not be able to be driven as it is.

Therefore, the present applicant has suggested a left side accelerator for physically handicapped persons in Japanese Utility Model Application No. 2840/1978.

However, in the prior art example of the Japanese Utility Model Application No. 2840/1978, when the left side accelerator apparatus is not used, it will be housed on the floor of the automobile driving seat but, in case a non-handicapped person is to drive the automobile by using the ordinary accelerator pedal and brake pedal, he will have to be nervous in the case of operating the brake so that the foot may not interfere with the housed left side accelerator apparatus. Also, depending on the kind of the automobile, the fitting position and housing position had to be changed and, for each automobile kind, the left side accelerator apparatus had to be made.

SUMMARY OF THE INVENTION

A first object of the present invention is to provide a left side accelerator apparatus for physically handicapped persons wherein a person physically handicapped in the right lower limb can operate the accelerator of an automobile with the left foot.

A second object of the present invention is to provide a left side accelerator apparatus for physically handicapped persons which, when not in use, will be able to be removed by one touch without a tool and will not be in the way of the operation of the ordinary accelerator and brake.

According to the present invention, there is provided a left side accelerator apparatus for physically handicapped persons wherein a cover member is removably provided on a base fixed on an automobile floor side, a main shaft is rotatably supported by the cover member, a left side pedal arm fitted with a left side accelerator pedal is fitted to the main shaft at the left end and a right side arm having a roller in contact with an automobile side accelerator pedal is fitted to the main shaft at the right end so that the automobile side accelerator pedal may be operated by treading in the left side accelerator pedal.

BRIEF DESCRIPTION OF THE DRAWINGS

The above described objects and the other objects of the present invention will be made apparent by the following descriptions and appended drawings. Embodiments of the present invention are exemplified in these descriptions and drawings but it is apparent that various modification can be made within the scope of the claims.

FIG. 5 is a disassembled perspective view of the apparatus of FIG. 1;

DETAILED DESCRIPTION OF PREFERRED EMBODIMENTS

Figure 1:
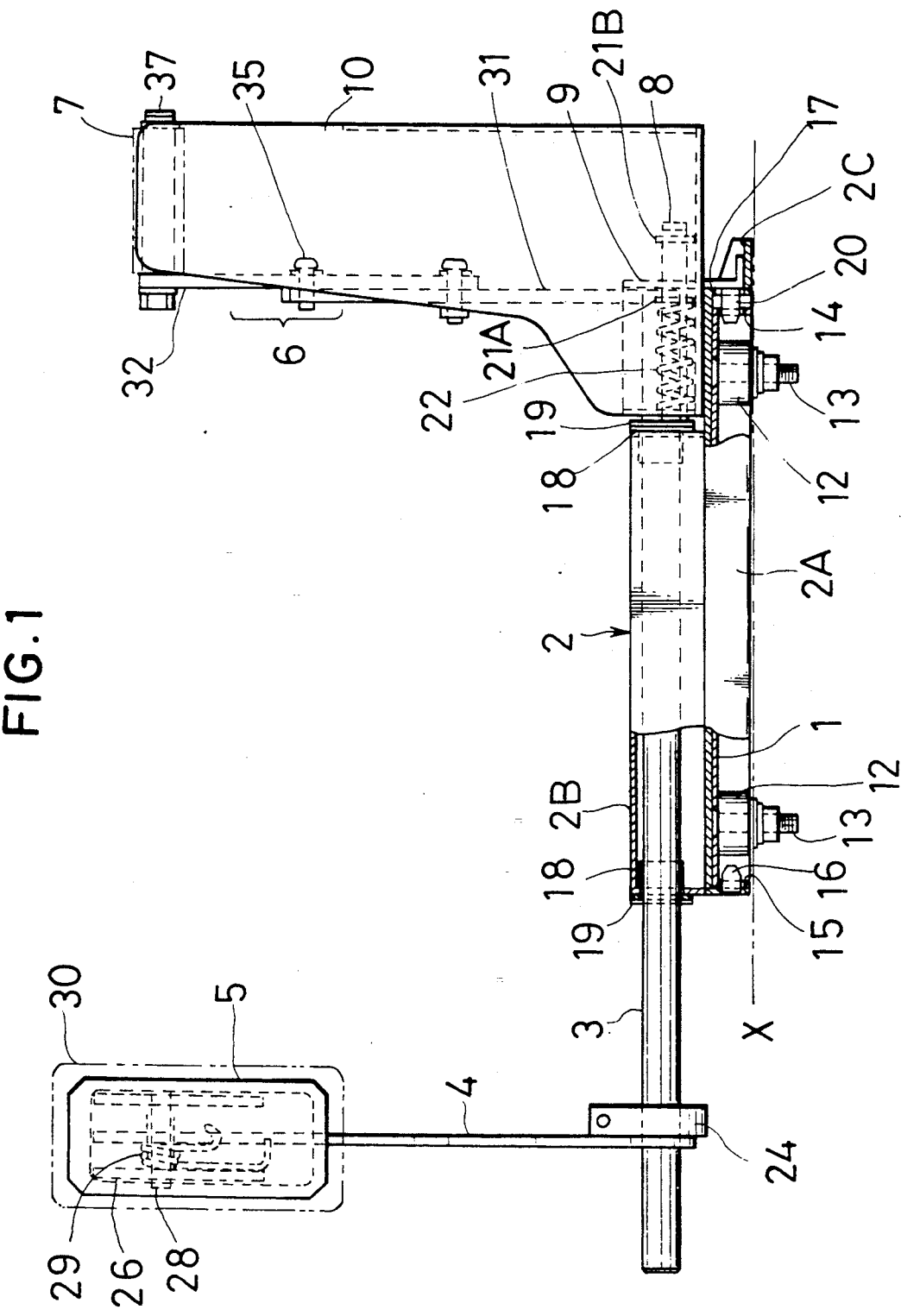
FIG. 1 is a partly sectioned elevational view showing an embodiment of a left side accelerator apparatus for physically handicapped persons according to the present invention.

In FIGS. 1 to 8, the reference numeral 1 represents a base fixed to an automobile driving seat floor surface (two-point chain line X) and 2 represents a cover member fitted to the base 1. The cover member 2 is made by integrally securing a fitting part 2A fitting as covering the outer surface of the base 1 and a shaft supporting part 2B with each other. A main shaft 3 is rotatably supported by the shaft supporting part 2B. The reference numeral 4 represents a left side pedal arm fixed to the main shaft 3 at the left end, 5 represents a left side accelerator pedal fitted to the left side pedal arm 4 at the tip, 6 represents a right side arm secured to the main shaft 3 at the right end and 7 represents a roller fitted to the right arm 6 at the tip and contactable with an automobile side accelerator pedal (represented by reference symbols AP in FIG. 3). A spring guide 8 is secured to the shaft supporting part 2B on the right end surface so as to be substantially parallel with the main shaft 3 and is laterally movably fitted with a shielding plate fitting bracket 9 which is made integral by welding or the like with a shielding plate 10 for shielding the automobile side accelerator pedal AP and right arm 6 on the front side.

As shown in FIGS. 1, 4, 5 and 6, the base 1 is formed to be flat rectangular parallelepipedal in the contour and hollow, has six screw fitting holes 11 formed on the upper surface so as to be fitted by selecting any of the fitting holes 11 depending on the shape of the driving seat floor surface (two-point chain line X) of the kind of the automobile to which the base 1 is to be fitted and has two sets of screws 13 fixed through spacers 12 from the floor surface. Respectively two right side engaging holes 14 and two left side engaging holes 15 are provided on both end surfaces of the base 1. The fitting part 2A of the cover member 2 is made like a box having an opening on the bottom surface so as to fit the outside of the base 1 and is provided on the inside left end surface with two engaging pins 16 as left side engaging members engaging with the left side engaging holes 15 of the base 1 and on the inside right end surface with two inserting holes 17 for passing the right side engaging members provided on the shielding plate 10 in the same positions as of the right engaging holes 14 of the base 1. The above mentioned main shaft 3 is inserted through holes formed on both sides of the shaft supporting part 2B and is rotatably borne through a bush 18 fitted to the through holes respectively. A retaining ring (E-ring 19 is fitted to each side part exposed out of the shaft supporting part 2B of the main shaft 3 to prevent the shaft 3 from moving in the lateral direction.

The shielding plate 10 is positioned on the right side of the cover member 2 so as to shield the right arm 6 and automobile side accelerator pedal AP on the front side and is made integral with the shielding plate fitting bracket 9 having through holes slidably fitting the spring guide 8 in the lateral direction. The fitting bracket 9 is provided with two engaging pins 20 as right side engaging members engageable with the right side engaging holes 14 of the base 1 through the inserting holes 17 of the fitting part 2A so that, when the fitting bracket 9 is laterally moved in contact with the upper surface of an extended plate part 2C extended to the right side of the fitting part 2A, the engaging pins 20 will be able to be smoothly fitted into the engaging holes 14. Two retaining rings (E-rings) 21A and 21B are fitted to the spring guide 8. A spring 22 is arranged between the left end of the fitting bracket 9 and the retaining ring 21A and energizes the bracket 9 in the direction (leftward direction) is which the engaging pins 20 engage with the base 1. The retaining ring 21B fitted to the spring guide 8 at the right end prevents the fitting bracket 9 at the right end from being pulled out of the spring guide 8. Thus, the shielding plate 10 is movable in the lateral direction and is energized in the leftward direction by the spring 22.

Figure 2:
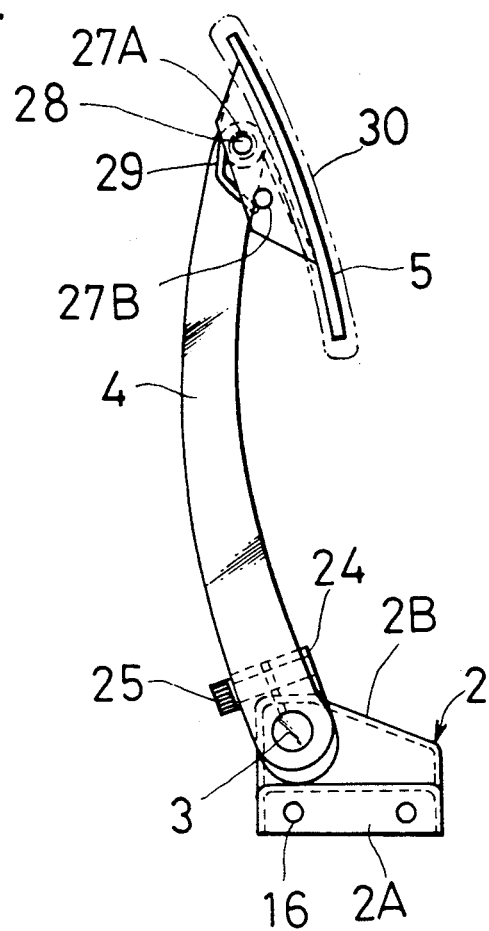
FIG. 2 is a left side view of the apparatus of FIG. 1.

As shown in FIGS. 2 and 5, a pin inserting pipe 23 forming a pin inserting hole of the inner periphery is secured to the left side pedal arm 4 at the tip and a holding member 24 is secured to the arm 4 at the lower end so that, when the main shaft 3 at the left end is inserted through the shaft inserting hole at the lower end of the left side pedal arm 4 and the screw 25 of the holding member 24 is tightened, the arm 4 will be able to be fastened and fixed to the main shaft 3 in any position and angle. A pedal fitting bracket 26 is secured to the left side accelerator pedal 5 on the back side and has two sets of pin inserting holes 27A and 27B formed in it so that, when a pin 28 is inserted through either of the pin inserting holes 27A and 27B and the pin inserting pipe 23 at the tip of the left side pedal arm 4 and a pedal spring 29 is arranged around the pin inserting pipe 3, the left side accelerator pedal 5 will be pivoted to the left side pedal arm 4. Ths upper inserting hole 27A is used in this embodiment but the lower inserting hole 27B may be used to adjust the height of the left side accelerator pedal 5. The pedal spring 29 is hung at one end on the left side pedal arm 4 and lifts at the other end the left side accelerator pedal 5 on the back side so that, when the left side accelerator pedal 5 is trodden in, the pedal 5 will rotate to be able to correspond to any trodden angle. A foot slip preventing pedal pad 30 is fitted to the left side accelerator pedal 5 on the trodden surface side.

Figure 3:
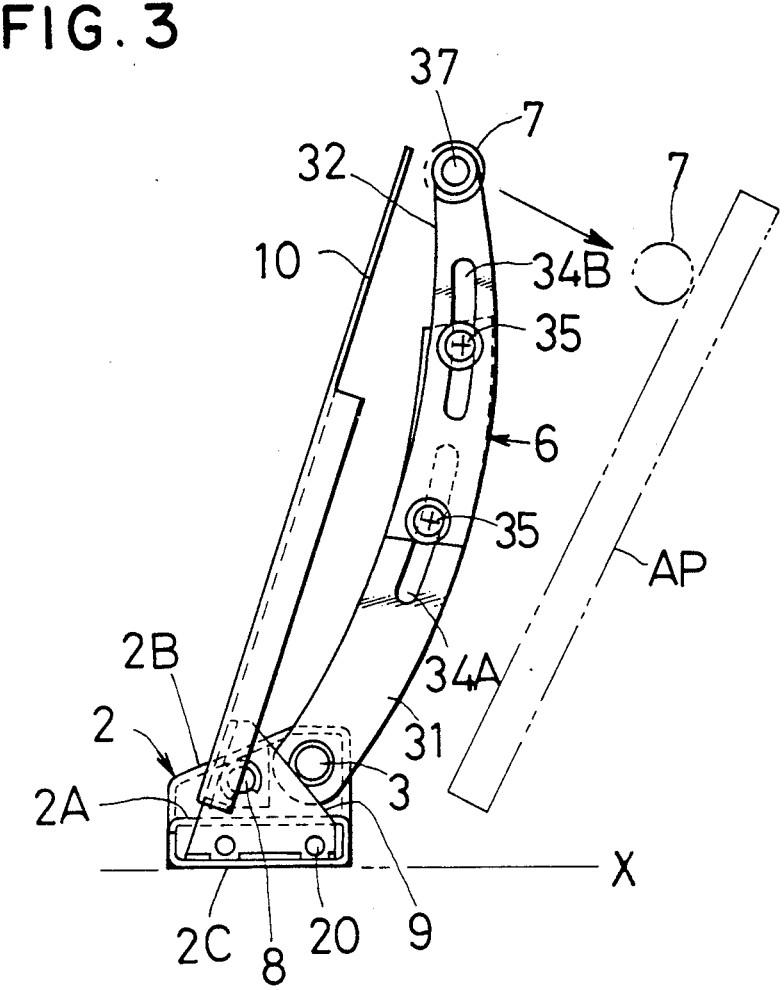
FIG. 3 is a right side view of the apparatus of FIG. 1.
Figure 4:
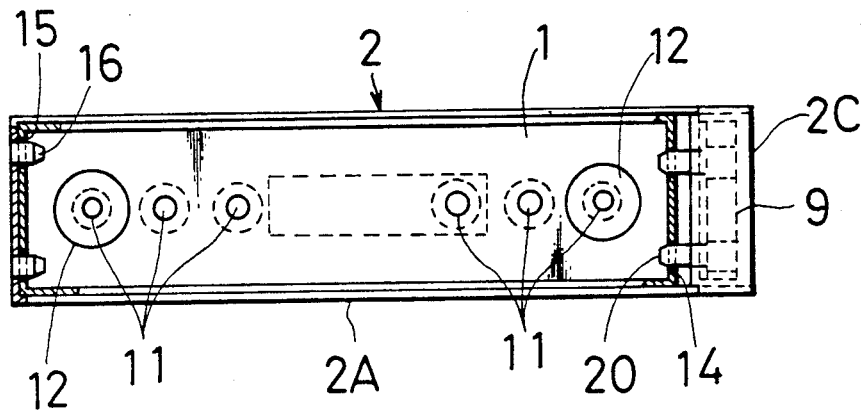
FIG. 4 is a bottom view of the apparatus of FIG. 1.

As shown in FIGS. 3 and 5, the right side arm 6 has a first arm 31 secured to the main shaft 3 and a second arm part 32 fitted with the roller 7, which are provided respectively with screw fitting holes (female screws) 33A and 33B and length adjusting slots 34A and 34B. By screwing respectively two sets of screws 35 into the screw fitting hole 33A of the first arm part 31 through the adjusting slot 34B of the second arm part 32 and into the screw fitting hole 33B of the second arm part 32 through the adjusting slot 34A of the first arm part 31, the first and second arm parts 31 and 32 are connected and secured to be of any length. The first arm part 31 is secured at the lower end by welding or the like to the main shaft 3 at the right end. A roller guide 37 to be inserted thropugh the roller 7 is fitted to the fitting hole 36 by a screw. The roller 7 made of a resin is rotatably fitted by the roller guide 37 projecting at right angles to the right side arm 6. As shown by the imaginary line in FIG. 3, when the apparatus is in use, this roller 7 will be in contact with the automobile side accelerator pedal AP. When the left side accelerator pedal 5 is trodden in, the roller 7 will rotate in contact with the automobile side accelerator peral AP which will be smoothly operated.

The proces of fitting and removing the embodiment apparatus by the above formation to and from an automobile shall be explained in the following. In the solid line state in FIG. 7, the cover member 2 is fitted to the base 1 fitted to the driving seat floor surface of the automobile, that is, the left side accelerator apparatus body is fitted to the automobile. In this case, as in FIGS. 1 and 4, the engaging pins 16 of the cover member 2 are engaged with the left side engaging holes 15 of the base 1 and the engaging pins 20 on the shielding plate fitting bracket 9 side are engaged with the right side engaging holes 14 of the base 1 through the inserting holes 17 of the cover member 2 so that the cover member 2 may be positively fitted and fixed to the base 1. At this time, the engaging pins 20 of the bracket 9 engaged with the right side engaging holes 14 will be energized in the leftward direction by the spring 22 so that the engaging pins 20 may be prevented from being pulled out of the right side engaging holes 14 and the left side accelerator apparatus body (cover member 2) may be prevented from dropping.

Figure 6:
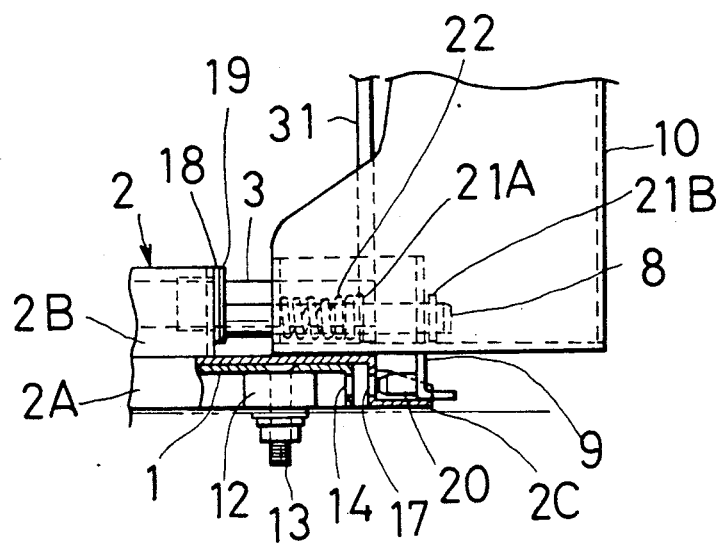
FIG. 6 is a partly sectioned view for explaining the operation.
Figure 7:
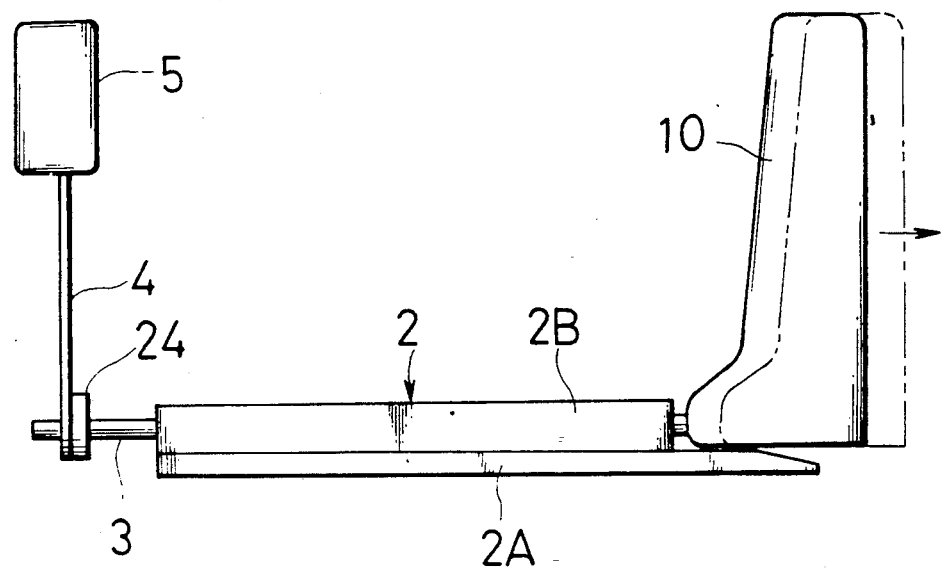
FIG. 7 is an elevational view showing the apparatus as fitted.
Figure 8:
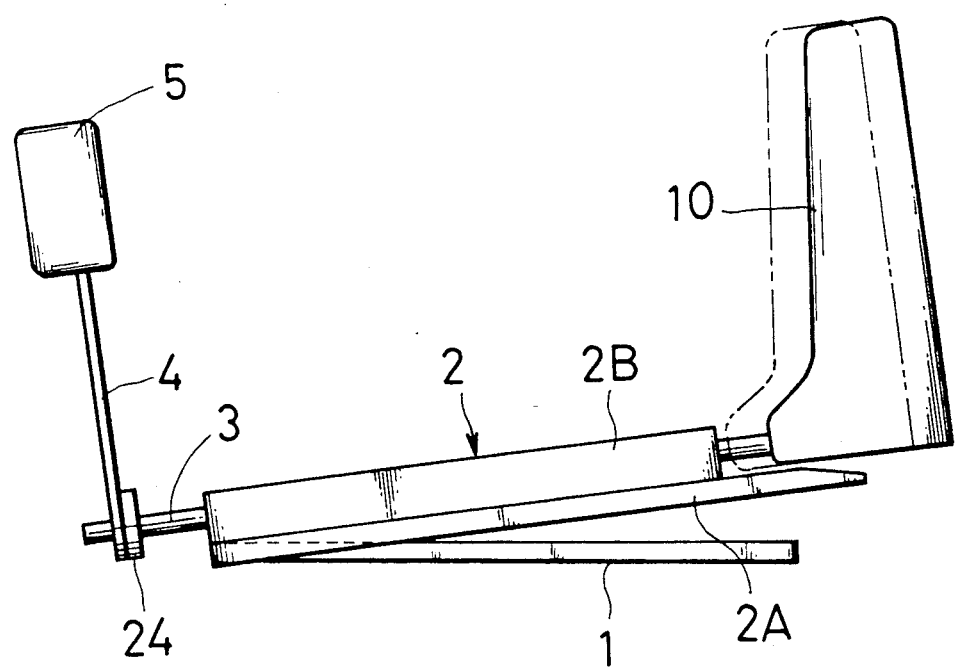
FIG. 8 is an elevational view for explaining the operation of removing the apparatus.

On the other hand, in the operation of removing the apparatus body from the automobile side (base 1), as shown in FIGS. 6 and 7, the shielding plate 10 is pulled in the rightward direction so as to be displaced to the two-point chain line position in FIG. 7, the engaging pins 20 of the shielding plate fitting bracket 9 are disengaged from the right side engaging holes 14, further, as in FIG. 8, the apparatus body is lifted on the right side and the engaging pins 16 of the left side cover member 2 are disengaged from the left side engaging holes 15.

In fitting the left side accelerator apparatus body to the automobile, it is fitted in the order reverse to the above mentioned order. That is to say, the shielding plate 10 of the apparatus body is pulled in the rightward direction while the engaging pins 16 of the left side cover member 2 are being engaged with the left side engaging holes 15 of the base 1, the shielding plate 10 of the apparatus body is pulled in the rightward direction, the cover member 2 is fitted to the base 1 as it is and the shielding plate 10 is returned to the original position so that the engaging pins 20 of the bracket 9 may be engaged with the right side engaging holes 14 and the apparatus body may be fitted to the automobile.

In the case of the above fitting, when the right side arm 6 is extended and contracted by adjusting the position of connecting the first arm part 31 and second arm part 32 by using the screws 35 and adjusting slots 34A and 34B so that the roller 7 fitted to the right side arm 6 at the tip may contact the automobile side accelerator pedal, the optimum contact position of the roller 7 and the automobile side accelerator pedal AP will be found and the first and second arm parts 31 and 32 will be screwed and fixed. In case the left side accelerator user sits on the driving seat and treads in the left side accelerator pedal 5 with the left foot, so that the left side accelerator may be in the optimum position in which it is easy to use, the arm 4 fitting position and angle with respect to the main shaft 3 will be adjusted by the holding member 24 at the lower end of the left side pedal arm 4 and the arm 4 will be fixed in the optimum lateral (right and left) direction position and fitting angle by using the screw 25. Further, by selecting either of the pin inserting holes 27A and 27B of the pedal fitting bracket 26 integral with the left side accelerator pedal 5, the bracket 26 will be fitted to the left side pedal arm 4 through a pin to adjust the height.

The general operation of the above mentioned embodiment shall be explained in the following. In case the cover member 2 having the left side accelerator apparatus body is fitted to the base 1 and a person physically handicapped in the right lower limb operates the accelerator by the left side accelerator pedal 5, the left side accelerator pedal 5 fitted to the left side pedal arm 4 at the tip will be made to fall on the floor surface side so that, as shown by the imaginary line in FIG. 3, the right arm side roller 7 may contact the automobile side accelerator pedal AP and the left side accelerator pedal 5 will be trodden in with the left foot so that the main shaft 3 to which the left pedal arm 4 is fixed may rotate, as operatively connected with it, the right side arm 6 secured to the main shaft 3 at the right end may rotate in the same direction as of the left side pedal arm, the roller 7 at the tip of the right side arm 6 may push down and operate the automobile side accelerator pedal AP and, as a result, the automobile will be accelerated the same as in the case that the ordinary accelerator pedal is trodden in. Also, the automobile side accelerator is prevented by the shielding plate 10 from being operated irrespective of the left side accelerator operation by any force (such as the contact with the right foot or the fall of an object).

On the other hand, as in the case that the ordinary driver operates the accelerator with the right foot, in case the left side accelerator is not used, as described above, the left side accelerator apparatus body (cover member 2) will be removed from the automobile (base 1) and the ordinary accelerating operation will be made. This removal can be made by one touch without using a tool.

According to the formation of the above embodiment, there can be obtained a left side accelerator apparatus for physically handicapped persons which can be fitted and removed by one touch operation, in which an automobile accelerating operation can be made with the left foot and which can be removed and can be stored in another place so as not to be in the way of the ordinary accelerating and braking operations when it is not used. The conventional left side accelerator apparatus is different in the fitting position and the dimensions of the respective parts depending on the kind of the fitted automobile and has had to be made for each kind of the automobile. However, in the apparatus shown in the embodiment of the present invention, the fitting position of the base 1 to be fitted to the driving seat floor surface and the position of the roller 7 in contact with the automobile side accelerator pedal can be so easily adjusted that the difference in the shape of the driving seat floor surface and in the position of the already provided accelerator pedal depending on the kind of the automobile can be well coped with without modifying the automobile body and the style when fitted is good.

Further, the fitting position and angle of the left side pedal arm 4 and the height of the left side accelerator pedal 5 can be so easily adjusted that the size of the foot of the left side accelerator user and the using position can be freely coped with.

Figure 9:
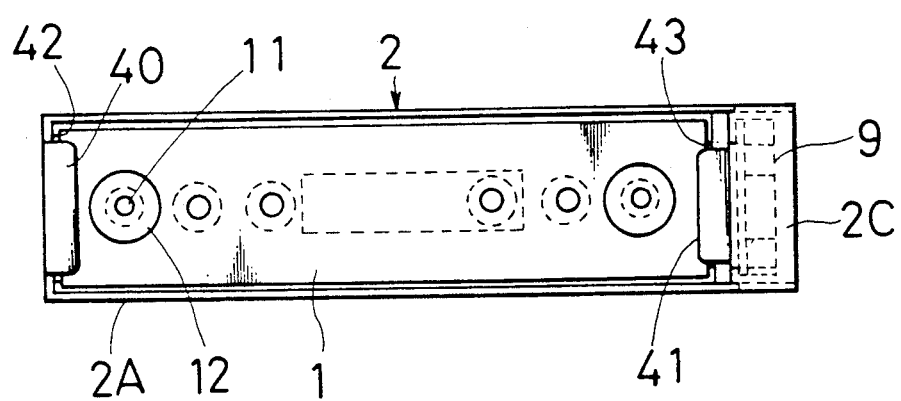
FIG. 9 is a bottom view showing another embodiment of the present invention.

FIG. 9 shows another embodiment of the present invention. In this case, in the fitting part 2A of the cover member 2 fitted to the base 1, and engaging tongue piece 40 as a left side engaging member is integrally formed and, in the shielding plate fitting bracket 9, an engaging tongue piece 41 as a right side engaging member is integrally formed. Recesses (incisions) 42 and 43 in which the engaging tongue pieces 40 and 41 can be respectively freely fitted are formed on the base 1 side. The other formations are the same as of the above described embodiment.

By the way, in the above mentioned respective embodiments, six screw fitting holes are provided in the base 1 but may be changed to be in any position and number in response to the driving seat floor surface of the kind of the automobile to which the apparatus is to be fitted. Two sets of pin inserting holes are provided in the left side accelerator pedal 5 but may be changed to be in any number in response to the pedal height adjusting position.

As explained above, in the left side accelerator apparatus according to the present invention, when the left side accelerator pedal is lowered on the floor surface and is trodden in with the left foot, the same as in the case of treading in the ordinary accelerator pedal, the accelerator will be able to be operated. Also, the apparatus can be fitted and removed by a simple one touch operation without using any tool. Further, the apparatus as fitted is prevented by a fitted spring from dropping and is therefore safe. In case the ordinary driver operates the accelerator by using the automobile side accelerator pedal, in the conventional left side accelerator apparatus, the apparatus housed on the floor surface will interfere with the foot and it has been necessary to be nervous in operating the brake. However, in the present invention, the left side accelerator apparatus body can be removed from the automobile and therefore the ordinary accelerating operation and braking operation will not be influenced. Further, the automobile side accelerator pedal and right side arm are shielded on the front side by the shielding plate and therefore the automobile side accelerator can be prevented from operating irrespective of the left side accelerator operation by any force (such as the contact with the right foot or the drop of an object).

What is claimed is:

1. A left side accelerator apparatus for physically handicapped persons comprising a base fixed to an automobile floor surface, a cover member fitted to said base, a main shaft rotatably supported by said cover member, a left side pedal arm secured to said main shaft at the left end, a left side accelerator pedal fitted to said left side pedal arm at the tip, a right side arm secured to said main shaft at the right end, a roller fitted to said right side arm at the tip and contactable with an automobile side accelerator pedal, a spring guide secured to said cover member, a shielding plate made integral with a shielding plate fitting bracket laterally movably fitted to said spring guide to shield said right side arm on the front side, a left side engaging member provided on said cover member side and engageable with said base on the left side, a right side engaging member provided on said shielding plate side and engageable with said base on the right side and a spring provided on said spring guide and energizing said bracket in the direction in which said right side engaging member engages with said base.

2. A left side accelerator apparatus for physically handicapped persons according to claim 1 wherein a plurality of pin inserting holes are formed in a pedal fitting bracket on the back side of said left side accelerator pedal and said left side accelerator pedal is fitted to said left side pedal arm by inserting a pin through any one of said plurality of the pin inserting holes and the pin inserting hole in said left side pedal arm at the tip.

3. A left side accelerator apparatus for physically handicapped persons according to claim 1 wherein said right side arm has a first arm part secured to said main shaft and a second arm part fitted to said roller and a length adjusting slot is formed in at least either one of said first and second arm parts which are connected and secured by using said slot.

4. A left side accelerator apparatus for physically handicapped persons according to claim 2 wherein said right arm has a first arm part secured to said main shaft and a second arm part fitted to said roller and a length adjusting slot is formed in at least either one of said first and second arm parts which are connected and secured by using said slot.

* * * * *